Figure 20:
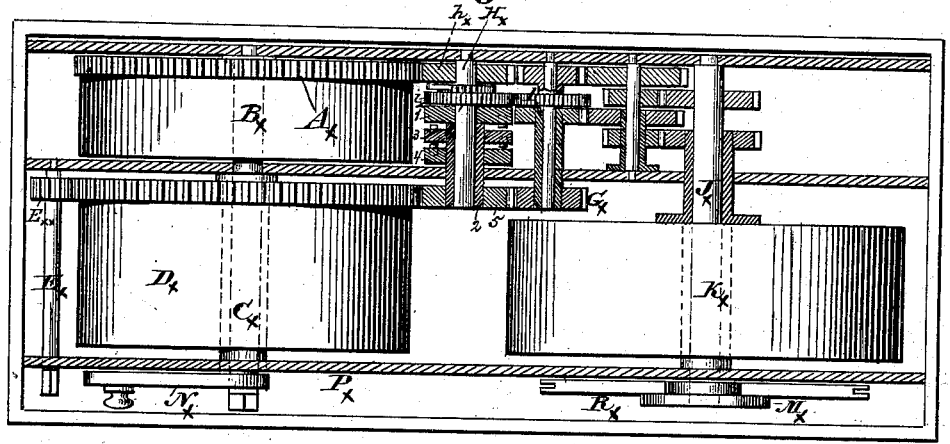

M. A. DALTON.
TIME-LOCKS.
No. 194,656. Patented Aug. 28, 1877.
4 Sheets—Sheet 1.
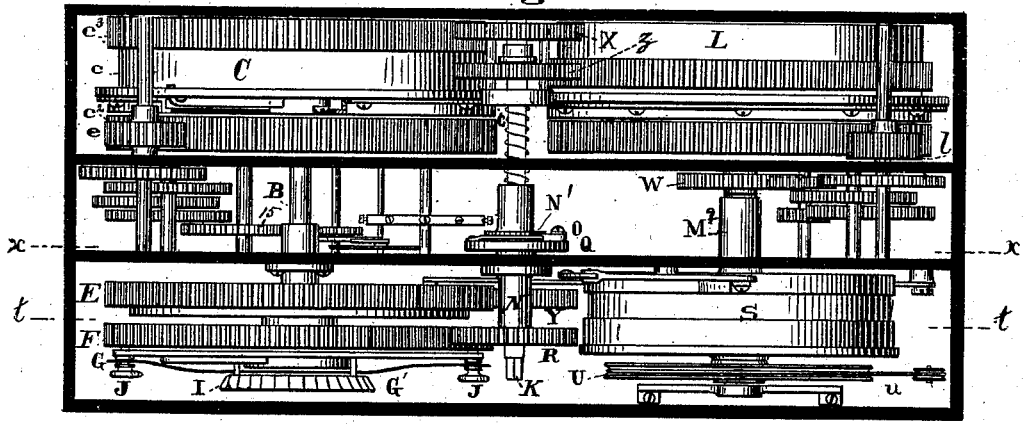
Fig. 1
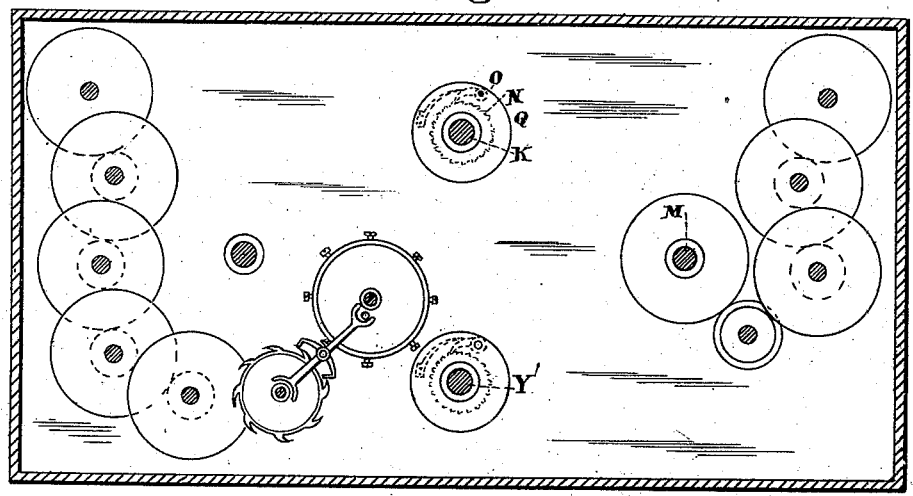
Fig. 2
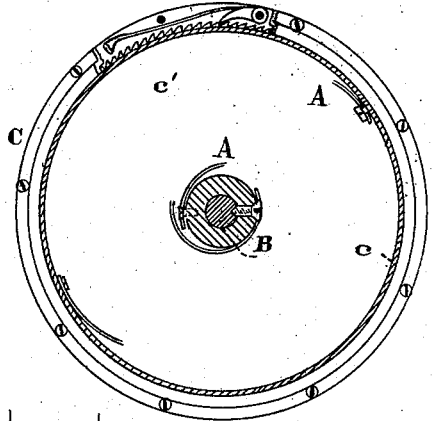
Fig. 3
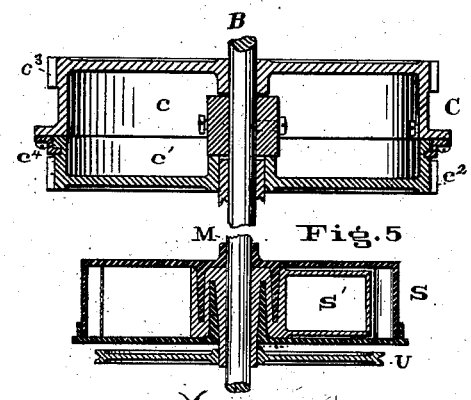
Fig. 4
Fig. 5
Attest
Chas. F. Gessert
Wm. O. Anderson
Inventor
Milton A. Dalton
by Geo. J. Murray
his Attorney M. A. DALTON.
TIME-LOCKS.
No. 194,656. Patented Aug. 28, 1877.
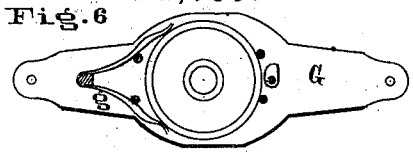
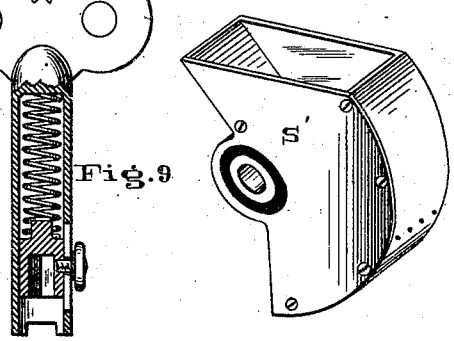
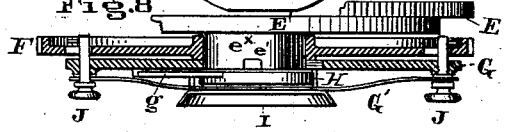
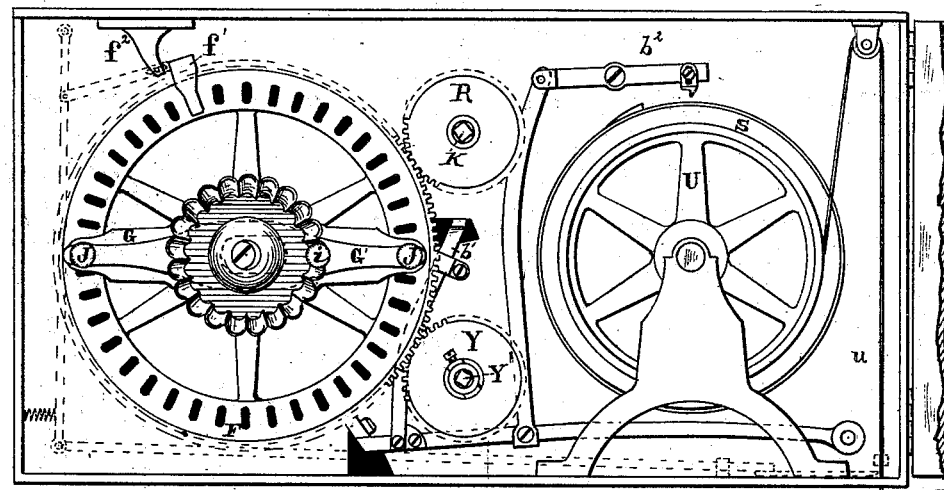
Fig. 11
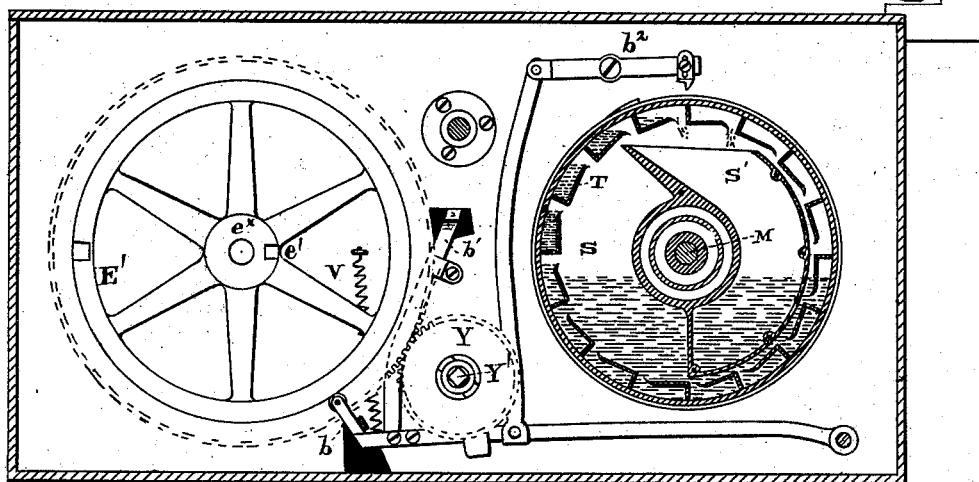
Fig. 12

4 Sheets—Sheet 3.
M. A. DALTON.
TIME-LOCKS.
No. 194,656. Patented Aug. 28, 1877.
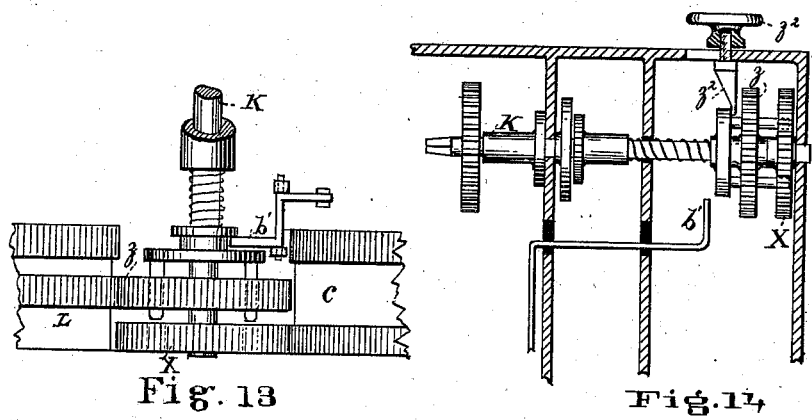
Fig. 13.  Fig. 14.
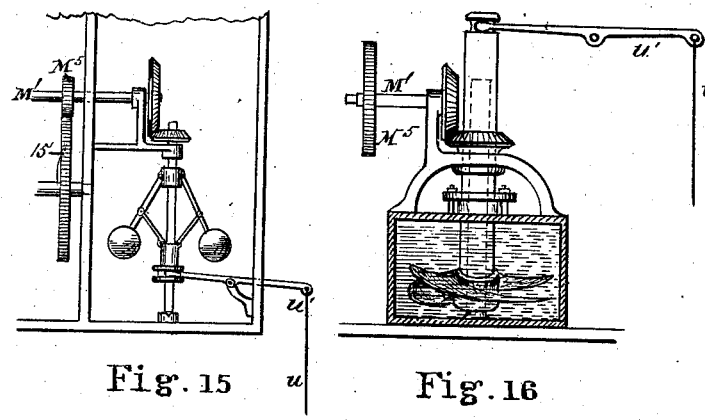
Fig. 15.  Fig. 16.
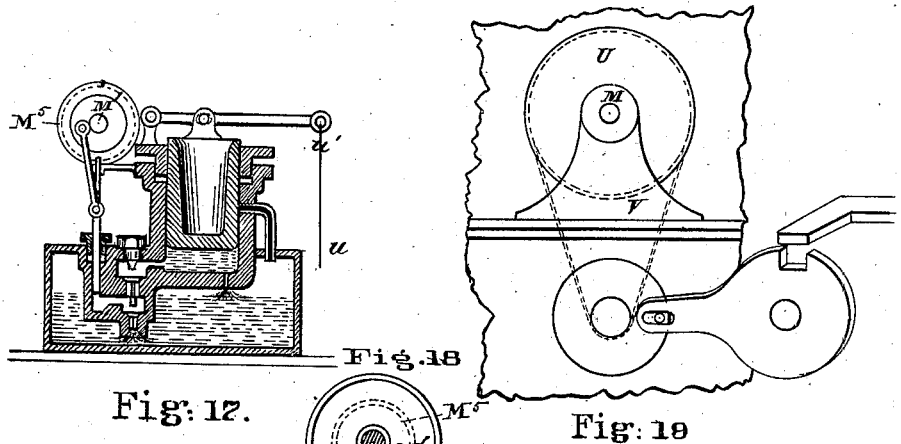
Fig. 17.  Fig. 18.  Fig. 19.
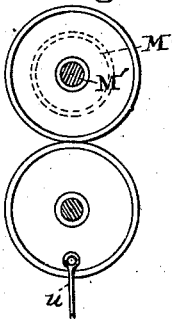
Attest
Chas. F. Gessert.
Wm. O. Anderson
Inventor
Milton A. Dalton
by Geo. J. Murray
his Attorney

M. A. DALTON.
TIME-LOCKS.

No. 194,656. Patented Aug. 28, 1877.

4 Sheets—Sheet 4.

Attest:
Chas F. Gessert
Wm O. Anderson

Inventor.
Milton A. Dalton
by Geo J Murray
his Attorney.

N. PETERS, PHOTO-LITHOGRAPHER, WASHINGTON, D. C.

UNITED STATES PATENT OFFICE.

MILTON A. DALTON, OF CINCINNATI, OHIO.

IMPROVEMENT IN TIME-LOCKS.

Specification forming part of Letters Patent No. 194,656, dated August 28, 1877; application filed June 13, 1877.

*To all whom it may concern:*

Be it known that I, MILTON A. DALTON, of Cincinnati, in the county of Hamilton and State of Ohio, have invented a new and useful Improvement in Time-Locks for Safes and other secure receptacles, of which the following is a specification:

The object of this invention is to so construct the mechanism of a time-lock that its time-movement will, on every stoppage, whether caused by design or by accident, automatically put the parts which control the dog for securing the non time-lock or bolt-work of the safe in such a condition that the said dog can be retracted. By this means all danger of being locked out by reason of any accidental stoppage of the time-movement before the appointed hour is avoided by the mechanism of the time-lock itself. This is an entirely new principle in time-locks, and cannot be confounded with previously-known means providing for the retraction of the dog of the time-lock in case of accidental stoppage of its time-movement, for such known means are in no instance structural parts of the time-lock and in constant use, but consist of a distinct supplementary mechanism, which is designed to come into operation only at the exceptional times when the time-movement of the time-lock is stopped by accident before the appointed hour.

The general principle of this invention is capable of embodiment in a multiplicity of forms. Those chosen to illustrate my invention all operate to automatically retract the dog on every stoppage of the time-movement, and in all of them it is designed, first, by means of suitable connections with an operative part of a lock or bolt work, to automatically place and retain in position, at any desired time, for any required length of time, an obstruction to the opening of the lock or door. Should the action of the movement or any of its parts be interrupted by accident, prearrangement in setting the parts, or other cause, it will, under every circumstance, have removed the obstruction by the time it comes to a complete stand-still, and avoid the danger of being locked out by a premature stoppage of the clock-movement. There is also thus avoided the necessity of duplicating movements to escape this danger and the necessity of employing extraneous means to enter the safe or receptacle, in case the movements of these should, from any cause, become out of order.

It is designed, second, to provide means whereby the movements of the parts may be set and automatically released or tripped at the desired time.

The first of these objects is accomplished thus: A time-piece acts upon an operative part of the lock or bolt work, through or by a regulator or controller and a suitable obstruction. While the controller is in motion it retains the obstruction in place, and when it is either tripped by the time-piece mechanism, or stopped by accident or disarrangement of the parts, or other cause, it releases the lock or bolt work.

The second object is accomplished by peculiar mechanism connected with the clock-movement, which may be set to release and interrupt the movement of the parts at the time when it is required to obstruct or remove the obstruction to the opening of the lock or bolt.

Figure 21:
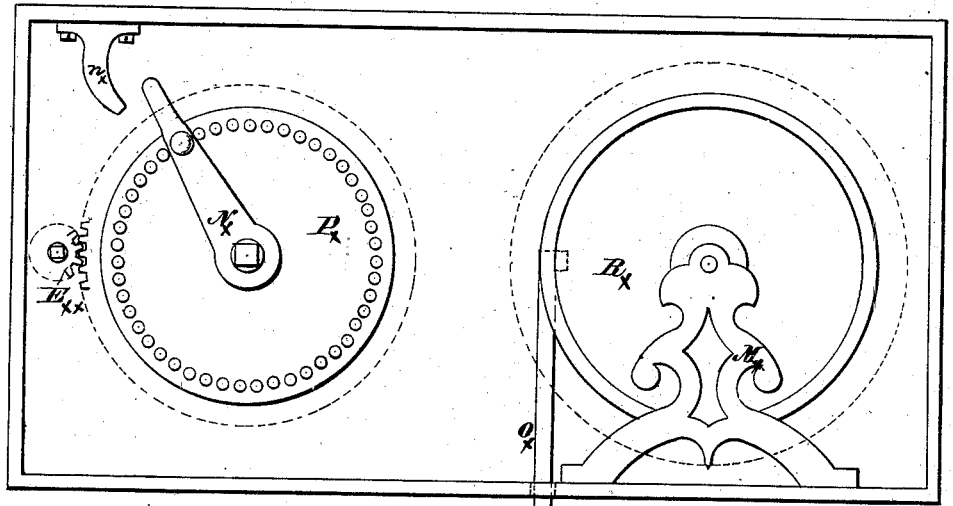

In the drawing, Fig. 1 is a top plan view of the time attachment, the top of the case being removed to expose the mechanism. Fig. 2 is longitudinal vertical section through line $x\, x$, Fig. 1. Fig. 3 is a vertical section through one of the going wheels. Fig. 4 is a transverse section of the same. Fig. 5 is a similar view of the regulator. Fig. 6 is a front elevation of the cross-head, by which the movements are set and tripped. Fig. 7 is a back view of the same; and Fig. 8 is a section plan of the cross-head and its connecting parts. Fig. 9 is a section view of the key for setting the inner dial and winding the springs. Fig. 10 is a perspective view of the holder. Fig. 11 is a front elevation of the time attachment; the door of the case is open and broken away. Fig. 12 is a section through line $t\, t$, Fig. 1. Fig. 13 is a plan view of the clutch by which the mechanisms of the two going wheels are connected and disconnected. Fig. 14 is a vertical section through shaft, Figs. 1 and 13, and shows the lever for operating the clutch. Figs. 15, 16, 17, and 18 show well-known mechanical devices, either of which, as well as others well known in the arts, may be substituted for the controller or regulator shown in the preceding figures. Fig. 19 shows a modification of the means of connecting the regulator with the dogging angle-bar, one of the permutation-tumblers, or some operative part of a combination-lock or its bolt-work, which will admit of the attachment being placed in any position on the inside of the door with relation to the lock. Fig. 20 is a top plan, partly in section. Fig. 21 is a front elevation of a modification of the time attachment; in this form but one set of shafts is used, and the movements of the regulator are tripped by permutation-tumblers instead of levers.

The shell or case which contains the mechanism is, for convenience and strength, divided into three compartments. The inner one of these contains the going wheels C and L and their connecting-pinions. The middle compartment contains the trains of clock-work and attachments through which the dials and regulator are controlled; and the outer one contains the dials, the regulator, and the tripping devices for releasing and interrupting the movements, and thus interposing and removing the obstruction to the opening of the safe at the desired periods.

C is one of the going wheels, or spring-case, and is composed of two parts, $c$ and $c^1$, Fig. 4, fitted together by means of the angle-piece $c^4$, so as to permit an independent movement of each.

B is a stationary shaft. One end of the main or driving spring is attached to this shaft, and the other end to the part $c^1$ of the wheel C. The two parts of the wheel are held and revolved together, when the spring is unwinding, by a pawl secured to one part and held in contact with a ratchet upon the other. (See Fig. 3.)

Upon the periphery and made part of the going wheel C are two cog-wheels—one, $c^2$, upon the part $c^1$, meshes into the pinion $e$ and drives the clock-work; the other, $c^3$, upon the part $c$, drives the pinion X and the front dial F through shaft K and pinion R.

Upon shaft K is secured a ratchet-wheel, N', and its click or pawl is secured to a flange projecting from the hub N, upon which hub is secured the pinion R, so that the mainspring may be wound by the key applied to the end of shaft K without moving the dials or clockwork.

The going wheel L is constructed like wheel C, just described. The cogs upon the front part of its case give motion to the gear-work and elevator S through pinion $l$, and the cogs upon the back part of its case revolve the inner dial E through the shaft Y', (its pinion not shown,) but like pinion X and its front pinion Y. The pinion Y is also fixed on a loose hub on its shaft, and is driven by a ratchet and pawl, the same as pinion R on shaft K, just described.

The form of regulator selected for interposing and removing the obstructions to the lock or bolt is the elevator S. This is composed of a cylindrical shell journaled upon the stationary shaft M, and connected with the gear-work of wheel L by the pinion W, secured upon the inner hub $M^2$ of elevator S, which projects into the middle compartment of the case for this purpose, and the vessel or holder S' swung eccentrically upon shaft M within elevator S. The hub of holder S' projects through the front face or head of elevator S, and has the wheel U secured upon it. The holder is open at the top, and has perforations near its bottom for leakage.

The elevator S is fitted with buckets T around its inner circle, and contains mercury, oil, sand, or other suitable substance.

The wheel U operates through suitable means (such as a chain, cord, or bar) on an operative part (such as the tumbler, dogging-lever, or other operative part) of the non time-lock to guard the latter, so that its bolt cannot be retracted; or it may act through intervening means on the bolt-work to dog it; or it may place its obstruction so as to make it act as the train or door bolt.

One form of connection is shown in Fig. 11, where the cord is attached to the angle-bar, which is to be drawn up by the cord behind the bolt of the non time-lock; and another form is shown in Fig. 19, where the chain operates through a crank-disk on a tumbler of the lock to turn the tumbler, so that the angle-bar cannot fall into the notches in the other tumblers.

When the elevator-shell is put in motion, the buckets T carry up the mercury or other substance, and empty it into the holder S'. When this becomes filled, as it will, the amount carried up and emptied into it by the buckets being greater than the amount that can waste through the lower perforations, it will swing to a lower position in the elevator, and, in doing so, partially revolve the wheel U, unwinding the cord $u$, so as to secure the non time-lock or bolt work, and remain in this position until, from any cause, motion of the elevator S is suspended, when, by wastage through the lower perforations, the holder is emptied, and returns to its elevated position, unwinding a portion of the cord from the wheel in doing so, and thus removing the obstruction which was held in place while the holder was depressed.

E is the inner dial. It is fitted to revolve upon stationary shaft B, and has a projecting hub, $e^x$, upon which the outer dial F and cross-head G are fitted. It has also projecting from its front face a notched rim or disk, E'. The office of this dial is to control, through the levers $b$ $b^1$ and arm $b^2$, the movements of the regulator. The detent of lever $b$ is held in contact with the rim E' by a spring, V, which draws and holds it into the notch of the rim when in the proper position.

F is the outer dial, and G the cross-head adjustably connected to it by its pins J J, which pass through slots in the face of the dial, and are held in by the spring G'. The dial F and cross-head are held on the hub $e^x$ of dial E by the cap H. In the periphery of hub $e^x$ is a notch, $e^1$, and the cross-head has a tongue, $e^2$, which is drawn into this notch, when the dials are in the proper position to permit it, by the spring $g$, which is secured to the cross-head, and has its bearing on the periphery of cap H. The pins J J are in radial line with tongue $e^2$. The notches in the hub and rim of dial E are also radially disposed, and in line with each other, as shown in Fig. 12, so that when the spring $g$ forces the tongue $e^2$ of cross-head G into the hub, it will, by means of one of the pins J, force the detent of lever $b$ out of the notch in the rim $E^1$ of dial E, and thus release the said dial. At the same time lever $b$ trips arm or lever $b^2$, releasing the elevator and its mechanism.

Upon shaft K, Figs. 13 and 14, is a clutch for connecting and disconnecting the gear-work of both going wheels C and L. The pinion $z$ of the clutch meshes into the cogs on the wheel L, and, being loose on shaft K, is held disconnected from pinion X, which is fast on shaft K, by the lever $b^1$, so long as the detent of lever $b$, which is connected with lever $b^1$, is in the notch of dial E.

The clutch proper has prongs passing through pinions $z$, as shown. When the detent is thrown out of the notch by the pin J lever $b^1$ releases the clutch, when its prongs are forced, by a spring on shaft K, through pinion $z$, and into their seats in pinion X.

The entire mechanism is thus united, the balance-wheel, connected with the clock-movement of wheel C, acting as the regulator of the whole. The springs of both going wheels are thus jointly employed, so that if one should break the others would drive the movement.

In addition to this precaution from accident from breaking springs, which is the part of a clock-movement most liable to accident, each of the wheels C and L is provided with two or more springs, as seen in Fig. 3. They are secured at different points on the shaft and wheel, and wound up together around their shaft. By this arrangement the danger of the outer dial-movement stopping by the breakage of one spring while the wheels C and L are disconnected is avoided, and, should one of the springs break, its power is not wholly lost, as it is tightly wound with the other spring, and will still exert some power in uncoiling and serve to strengthen the remaining spring or springs.

The mode of setting the time-lock is as follows: The clutch on shaft K is drawn forward, and, by tightening the thumb-screw of $z^2$, is held forward by the sliding stop $z^2$. The dial E is revolved to the left by the key, the outer part of which fits the hub of pinion Y (the key for winding the spring is within the barrel of the key, and adjustable by a spring and set-screw—see Fig. 9) until the detent of lever $b$ enters its notch in the rim of the dial. This turns the arm or lever $b^2$, so that its pawl will engage a tooth on the elevator S, and causes lever $b^1$ to engage the clutch on shaft K; then the lever $b^1$ holds the clutch, and thumb-screw $z^2$ must be released. The dial F is then turned until the tongue $e^2$ of the cross-head G finds the notch $e^1$ in the hub $e^x$ of dial E. The pins J J are now withdrawn from the slots in the front dial, and the cross-head G is turned back in a contrary direction from the direction taken by this dial when moved by the mainspring, until its tongue $e^2$, which is opposite the button $i$ in cap I, is moved as far as desired from notch $e^1$. This determines the time the regulator will remain idle. The dog $f^1$ is then placed in the desired slot in the front dial, the dog being removable and held in position by any suitable means. The slots indicate the divisions of time, (the dial being geared to revolve once in forty-eight hours, or more, if desired.) The pins J J of cross-head G are caused to enter the slots in dial F opposite to which they have been moved. The outer dial will now revolve, carrying the cross-head with it, until the tongue $e^2$ comes opposite notch $e^1$, when spring $g$ moves the cross-head across the dial, so that one of the pins J will force the detent of lever $b$ out of the notch in rim $E^1$ of dial E, releasing it. At the same time the clutch is moved by lever $b^1$ to connect pinions $z$ and X, and the regulator is released from arm or lever $b^2$. The whole movement will now run together, and the obstruction to the opening of the safe be placed and retained in place until the dog $f^1$ comes against the stump $f^2$ upon the upper part of the case and stops the movement.

Should it at any time be desirable that the obstruction to the opening of the safe should not in any event be removed until the time fixed by the dial F, there is, by dotted line in Fig. 11, shown an arrangement for accomplishing this purpose. This consists of a spring-catch located near the opening in the case, through which the cord or bar from the wheel U passes, which will permit a knot on the cord or a projection on the bar to be drawn up past it, but not to slip back until the catch is withdrawn by a lever operated by the dog $f^1$ just before it reaches the stump $f^2$.

Figs. 15 and 16 show two forms of governors, and Fig. 17 is a hydraulic press, either of which may be substituted for the regulator shown in the preceding figures. These modified forms of regulators may be driven from wheel W, (see Fig. 1,) in which case the tripping devices there shown as intervening between the regulator and the time-movement may be retained by arranging lever $b^2$ to lock and unlock wheel W; or the regulator may be driven directly by the time-movement from wheel 15 thereof, in which case all the tripping devices and the going wheel L and its train of gearing are dispensed with. A cord or bar, $u$, is here also used as the link between the lever $w'$ of these regulators and the obstruction or dogging device.

In Fig. 18 the cord or bar is connected with a crank-pin in the face of a friction-wheel. The contact of the wheels is so regulated as to draw up and hold the weight of the dogging apparatus when shaft M' and its wheel revolves, and permits it to slip back when the shaft stops.

It is obvious that this time-lock can be made to automatically operate the bolt-work of a door, and thus avoid the necessity of using a non-time-lock, or making an arbor or handle opening in the door, because the cord $u$ can be attached to a bolt passing through straps on the door, and made to enter a mortise in the jamb or a notch in the train-bolt. When used in this way it would be best to have the regulator force and hold the bolts in their seats while in motion, the bolts to be withdrawn by gravity or a spring when the regulator is at rest.

In Figs. 20 and 21, $A_x$ and $D_x$ are the going wheels, corresponding to the going wheels C and L in the other figures. The smooth part or barrel of going-wheel $A_x$ is fixed rigidly to the case, while the cogged part is secured to shaft $B_x$ to turn on the smooth part. The spring in this going wheel is at one end fixed to the stationary barrel, and at the other end to the shaft $B_x$, by which it is wound. The spring in the barrel of going wheel $D_x$ is wound by turning said wheel by means of a shaft, $E_x$ and pinion $E_{xx}$, the inner end of the spring being fastened to a fixed sleeve, $C_x$. The outer end of shaft $B_x$ carries an arm, $N_x$, which acts as a pointer to a dial, and also as a dog to stop the clock-work on coming in contact with the fixed projection $n_x$, all as shown in Fig. 21.

The cogs on wheel $A_x$ mesh into a pinion, $h_x$, which carries a pawl to engage a ratchet on pinion $i_x$, which is fixed on shaft $H_x$. Thus in winding the spring of wheel $A_x$ shaft $H_x$ remains stationary, but it is started the moment wheel $A_x$ is moved in the other direction by its spring.

The shaft $H_x$ carries a fixed disk, 1, and a loose sleeve, 2, on which sleeve are a loose disk, 3, a fixed disk, 4, and a fixed pinion, 5. The pinion 5 meshes into the cogs on going wheel $D_x$ and pinion $G_x$, which latter operates the elevator $K_x$ through a train of wheels, as shown. The train of wheels starting directly from pinion $i_x$ are the clock-wheels, and do not directly act on the elevator.

It will be observed that the object of the arrangement of disks is to let a certain time elapse after the starting of the clock-work before the elevator is put in motion, and that so far as this object is concerned going wheel $D_x$ may be wholly dispensed with, provided the spring of going-wheel $A_x$ is made of sufficient strength.

When the going-wheel $D_x$ is used, a suitable tripping device (not shown) is to be arranged between the pinion 5 and the elevator $K_x$ to lock the latter, and thus stop wheel $D_x$ until the pinion is started by the clock-work.

On starting the clock-work the fixed disk 1 on shaft $H_x$ will, after a certain time, pick up disk 3, and through it disk 4. That will start pinion 5, which immediately acts on the tripping devices, and releases the elevator $K_x$, so that going wheel $D_x$ may start to drive the elevator. Of course, if going wheel $D_x$ is not used the clock-movement itself will drive the elevator directly through pinion 5 and its train of wheels.

At the moment of the release of the wheel $D_x$ it is also connected through the disks with the wheel $A_x$, so that both act in unison to drive the elevator $K_x$ (which corresponds to elevator S in the other figures) through the train of wheels shown in Fig. 20.

The elevator operates on a wheel for shifting the dogging devices, in the manner heretofore described.

In Fig. 21 I have shown how a bar may be used as the link intermediate between the controller and dogging devices.

I claim—

1. In a time-lock consisting of a unitary train of mechanism, the combination, substantially as specified, of the time-movement, the dogging device for securing the non time-lock or bolt-work of the safe, and an intermediate regulator, which controls said dogging device and automatically provides for the immediate unlocking thereof when the time-movement is stopped by accident before the appointed hour, in the same manner and by the same means as when it is stopped at the appointed hour, the three elements named being connected together by any well-known means for transmitting motion—such as shown, for instance.

2. The combination, substantially as described, of an automatic regulator or controller with a time mechanism; the regulator when in motion automatically interposes and retains in position an obstruction to opening a lock or door, and on ceasing motion automatically removes such obstruction, and the time mechanism automatically starts and interrupts the regulator.

3. The combination, substantially as shown, of an automatic regulator or controller, a time mechanism and intermediate devices for governing the time between the starting of the time mechanism and the regulator; the regulator when in motion automatically interposes and retains in position an obstruction to opening a lock or door, and on ceasing motion automatically removes such obstruction, and the time mechanism automatically either releases or interrupts the regulator as and when desired.

4. In combination, the lever $b$, arm $b^2$, dial E, hub $e^x$, and cross-head G for interrupting the regulator, as and for the purpose specified.

5. In combination with the mechanism of two going wheels, each geared with a pinion, the clutch for connecting and disconnecting the said pinion, the said clutch being connected with and operated by the dial mechanism, substantially as shown and described.

6. In a time-lock for safes, the combination of two springs for driving the going barrel of the time-piece, the spring being wound together and attached to the shell and its shaft, as shown.

7. The combination of the dials E and F and cross-head G, the dial E having a notched rim and hub, the dial F perforated to receive the pins of the cross-head, and the cross-head having the pins J J and tongue $e^2$, the parts being fitted in the manner shown, and for the purpose described.

8. The elevator composed of a cylindrical shell with buckets upon its inner circle, and the holder journaled eccentrically upon its shaft within the shell, the whole constructed to operate as described, and for the purpose specified.

MILTON A. DALTON.

Witnesses:
L. P. KINSEY,
GEO. J. MURRAY.